Oct. 15, 1929.    H. B. WALKER    1,731,914
CONVEYER APPARATUS
Filed Aug. 27, 1927    2 Sheets-Sheet 2

INVENTOR.
Henry B Walker
BY Archimith Martin
ATTORNEYS.

Patented Oct. 15, 1929

1,731,914

UNITED STATES PATENT OFFICE

HENRY B. WALKER, OF MARION, OHIO, ASSIGNOR TO THE FAIRFIELD ENGINEERING COMPANY, OF MARION, OHIO, A CORPORATION OF OHIO

CONVEYER APPARATUS

Application filed August 27, 1927. Serial No. 215,841.

My invention relates to conveyer apparatus, and more particularly to conveyers of the portable type.

One object of my invention is to provide a conveyer that is more conveniently portable than the various types heretofore employed and which may be moved from place to place manually.

Another object of my invention is to provide means for manually shifting an inclined conveyer, so that its lower end may be forcibly moved into a pile of loose material, from time to time, as the loading or transfer of said material progresses.

Still another object of my invention is to simplify and improve generally the structure and operation of portable conveying devices or other wheeled structures.

Figure 1:
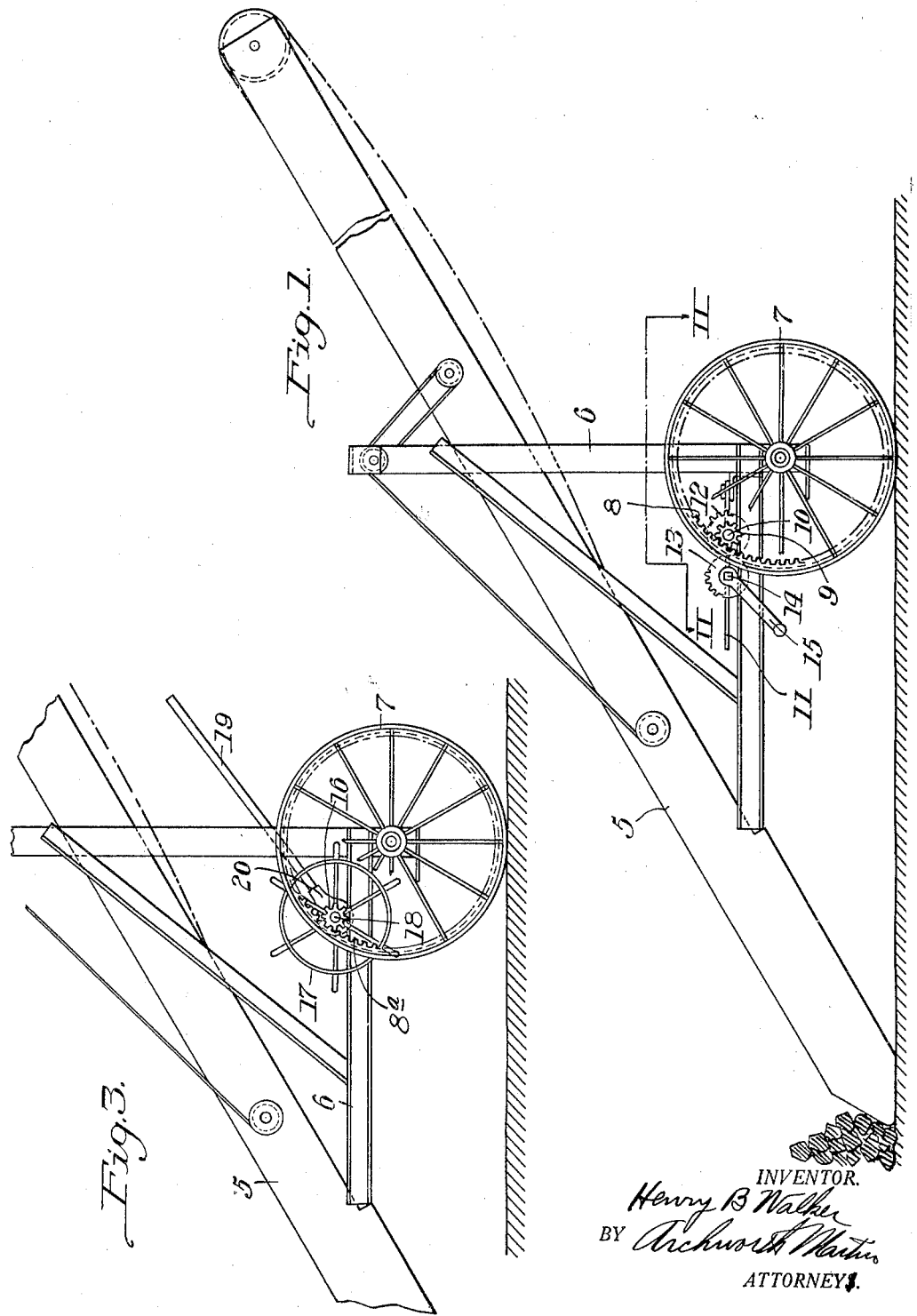
Figure 2:
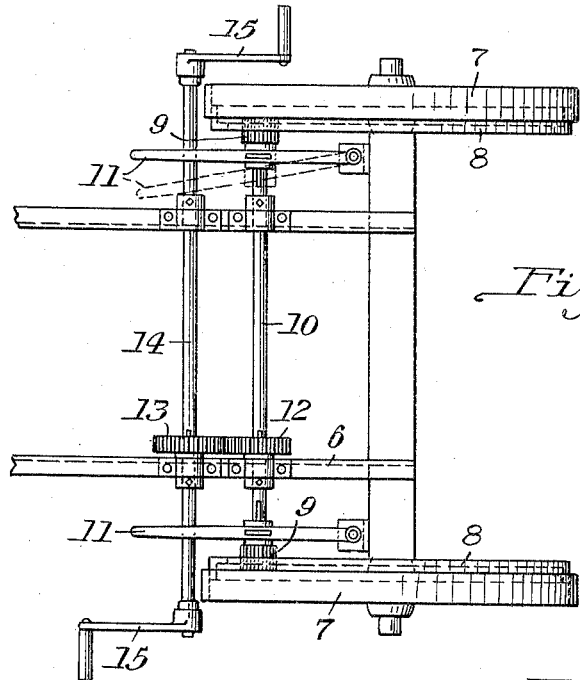
Figure 4:
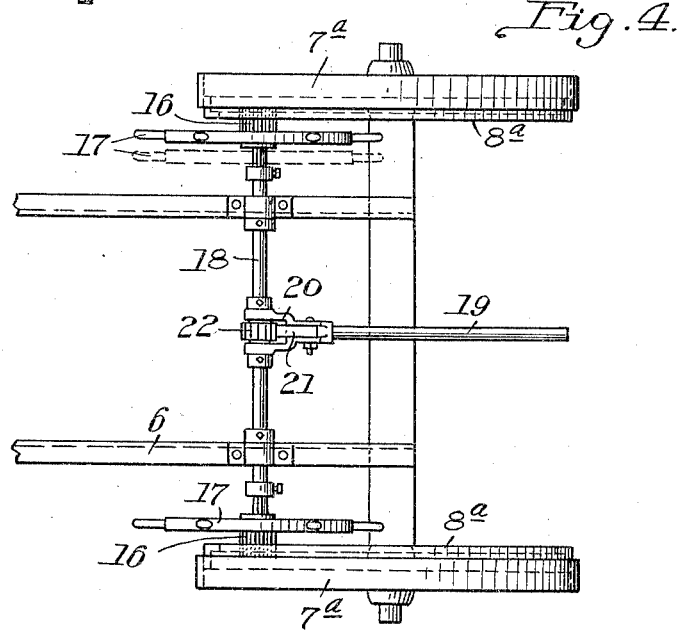

Some of the forms which my invention may take are shown in the accompanying drawing, wherein Figure 1 is a side elevational view, partially in section, of one form of apparatus embodying my invention; Fig. 2 is a view taken on the line II—II of Fig. 1; Fig. 3 is a view similar to Fig. 1, but showing another form of apparatus, and Fig. 4 is a plan view thereof with the conveyer proper removed.

Referring to Figs. 1 and 2, I show a conveyer indicated generally by the numeral 5 and which may be of any ordinary form and adapted to transfer material from a point near the lower end thereof and discharge it at the upper end, the conveyer being mounted upon a carriage composed of a framework 6 and wheels 7.

The carriage may be hauled from place to place by a tractor or other motive power, in the usual manner, but my invention is more particularly directed to means whereby the carriage can be manipulated manually over short distances or to turn the same to desired positions. To this end, I provide operating mechanism which will now be described.

An internal gear member 8 is secured to each of the carriage wheels 7 and meshes with one of the gear wheels 9 that are slidably keyed upon the ends of a shaft 10, so that they can be slid into and out of driving engagement with the gears 8, by means such as gear shift levers 11. A gear wheel 12 is secured to the shaft 10 and meshes with a pinion 13 that is mounted upon a shaft 14. A crank 15 is secured to each end of the shaft 14 so that the pinion 13 may be rotated to drive the wheels through the connections just described. The carriage may therefore be driven by men at either or both sides of the carriage, to move the carriage through short distances. By reason of the independently mounted gear shift levers 11, either of the traction wheels 7 may be driven independently of the other, so as to secure any desired turning movement of the carriage. It will, of course, be understood that any suitable gear reduction may be employed between the shaft 14 and the wheels 7, so that workmen will have no difficulty in moving the carriage.

Referring now to Figs. 3 and 4, I show apparatus similar to that of Figs. 1 and 2, particularly with respect to conveyor and carriage structure. In this form of apparatus, the carriage wheels 7ª are driven by pinions 16 formed on hublike extensions of hand wheels 17, or otherwise connected therewith. The hand wheels 17 are slidably keyed to a shaft 18 so that the pinions can be slid into and out of mesh with the internal teeth 8ª on the wheels 7ª. It will be seen that with the pinions 16 in mesh with their respective wheels, rotation of either of the hand wheels 17 will cause the wheels 7ª to be driven and thus move the carriage in a straight line. If one of the hand wheels 17 be shifted inwardly to move its pinion out of mesh, rotation of the shaft 18 will cause only one of the wheels 7ª to be driven, thus effecting a turning movement of the carriage.

In case it is desired to move the lower end of the conveyer farther into a pile of material, the carriage can be conveniently shifted by means of a hand lever 19 that engages a handle socket 20 which has pivotal connection with the shaft 18. The socket member 20 carries a pivoted pawl 21 which engages with the teeth of a ratchet wheel 22 that is secured to the shaft 18, so that when the lever 19 is moved in one direction, the shaft 18 will be rotated to drive the wheels 7ª. Under some conditions, the lever 19 is more conveniently accessible than the hand wheels, and in addition, it may be detachable and of such length that a greater leverage is secured than is possible with the hand wheels.

It will be apparent that the pawl and ratchet mechanism of Fig. 4 can also be applied to the shaft 10 of Fig. 2, to move the carriage of that figure without the use of the cranks 15.

I claim as my invention:—

1. Carriage structure comprising a pair of traction wheels, a shaft, a driving connection between each end of said shaft and one of the wheels, means adjacent to one end of the shaft for manually turning the same, means for selectively disconnecting said wheels from said shaft, and a pawl and ratchet device intermediate the ends of said shaft for turning the same.

2. The combination with a conveyer frame, of a wheeled carriage therefor, a shaft carried by the frame, a driving connection between each end of the shaft and one of the wheels, means for manually turning said shaft from one end thereof, a pawl and ratchet device intermediate the ends of the shaft for turning the same and located beneath the conveyer frame, and a lever for operating said device.

In testimony whereof I the said HENRY B. WALKER have hereunto set my hand.

HENRY B. WALKER.